United States Patent [19]
Zeleny

[11] 3,720,134
[45] March 13, 1973

[54] CONTROL SYSTEM FOR MACHINE TOOL MEMBERS

[75] Inventor: Jaromir Zeleny, Prague, Czechoslovakia

[73] Assignee: Vyzkumny ustav obrabecich stoju a abrabeni, Prague, Czechoslovakia

[22] Filed: March 3, 1970

[21] Appl. No.: 16,092

[30] Foreign Application Priority Data

March 6, 1969 Czechoslovakia..................1646/69

[52] U.S. Cl..................90/11 R, 90/13 R, 90/58 R, 82/2 D, 318/632, 318/676
[51] Int. Cl..........................B23b 9/00, B23b 17/00
[58] Field of Search............90/13 R, 11 R, 58 R, 62; 82/2 D, 14 D; 318/632, 676

[56] References Cited

UNITED STATES PATENTS

| | | | |
|---|---|---|---|
| 2,983,199 | 5/1961 | Daugherty | 90/15 |
| 3,027,813 | 4/1962 | Seborg | 90/15 |
| 3,145,622 | 8/1964 | Rust et al. | 90/13 |

Primary Examiner—Gil Weidenfeld
Attorney—Richard Low and Murray Schaffer

[57] ABSTRACT

A control system for positioning relatively movable machine tool members comprising a templet secured to one of said machine members, a servo indicator secured to the other of said members and adapted to engage the templet to produce a signal indicative of the direction and degree of deviation between said members, a servomotor position in contact with one of said members responsive to said signal to reposition said member until full compensation for said deviation is effected.

18 Claims, 7 Drawing Figures

INVENTOR
JAROMIR ZELENY

Fig. 3.

CONTROL SYSTEM FOR MACHINE TOOL MEMBERS

BACKGROUND OF THE INVENTION

The present invention relates to apparatus for adjusting and maintaining the positions of relatively movable machine parts, and in particular, to apparatus for guiding the movement of linear or rotating portions of machine tools such as milling machines, lathes and the like.

Conventionally, the relative portions of large, heavy, and massive machine tools have been guided by rolling carriages, hydraulic or mechanical jacks or hydrostatic guideways. The devices have many disadvantages, amongst which are:

the creation of uneven frictional forces due to variable loading;

the necessity of maintaining accurate machined surfaces to insure hardened rolling and guide surfaces;

loss of hydraulic fluid during operation caused by deformation and deflection of the parts; and excessive response to working forces, weight of the workpiece and the forces of movement and friction.

As a result, the prior devices had to be built with excessively dimensioned machine frame and supporting parts. The guide devices themselves were not fully responsive to deflection and deformation or relative movement of the parts and, consequently, readjustment and control was difficult.

It is a principal object of the present invention to provide an improved apparatus overcoming the aforementioned disadvantages.

It is another object of the present invention to provide an improved guide mechanism for the control and proper maintenance of relatively movable machine parts.

It is still another object of the present invention to provide an improved machine tool and mechanism facilitating its operation.

SUMMARY OF THE PRESENT INVENTION

The present invention is adapted for use with machine tools such as milling machines or vertical lathes having two major machine parts, one or both of which are movable relative to the other. According to the present invention, a templet or cam is secured to one of the machine parts and a servo synchro device is secured to the other of the machine parts in engagement with the templet. The synchro device is a linear indicator adapted to produce a signal indicative of the direction and degree of deviation of one or the other of the parts from a predetermined null or neutral position. Servo motors are positioned in contact with the first of the machine parts and in response to the signal reposition that part and until full compensation for the deviation is effected.

The templet may be a horizontal member partially self-supporting; it may be pivotally fixed to the machine part and may be supported at least on one spot by means of a spring. The templet may also be provided with a hollow space or bore for passage of a cooling fluid, or it may be fixed onto brackets and frame parts provided with a bore for the medium. The templet may also be part of the machine part guideway. Individual position synchro servo indicators may comprise a follower slide valve with a follower functioning as a contact path indicator in contact with the templet. The servo motor could comprise a hydraulic pressure cylinder being carried on one of the respective machine parts, and a piston which is urged by means of the hydraulic fluid to the adjacent guideway surface on the other machine part. The piston may be provided with elevating recess or piston faces lying close to the guide surface and may be provided with a throttle valve element. Additionally, a locking slide valve may be provided to hold the piston against movement.

The advantages of the present invention appear in the fact that it permits positioning of the guided machine part independently from outer forces such as the weight of the controlled machine part and the temperature influence. Only minimal friction forces or oil loss may result. This means that it is possible to design a frame or at least some parts of the frame which may be independent of these external outer forces and which may be independent of those forces created by the machine itself, e.g., by cutting, friction and weight forces.

For every machine part guided in the respective direction of the working motion, it is necessary to use at least two position servo mechanisms, which effect the positioning of the guided machine part in the direction perpendicular to the working motion. Preferably, five units should be used since their effect limits five directions of movement so that, in effect, only one direction of movement, i.e., the working motion, may take place. The servo indicators are mounted to sense perpendicular deviation and are usually arranged in the direction parallel to the direction of the indicated deviation. Thus, the actual indicated deviation may be consistently held to a minimal one.

The device, according to the invention, uses all properties of a position servo mechanism, especially the ability of being statically rigid. As to servo mechanisms, it is usually required that they follow up quickly the changed position and thus should be quickly responsive to feed-back. Here, it is necessary only to keep the controlled mass or machine part in position determined by the respective part of the control frame and therefore minimal demands are required as to the working lift or elevation of the respective servo motors. Maximal lift is determined by maximal deviations that may come during operation between the control frame and machine frame. It is clear that there are no demands as to a quick function of the position servo mechanisms. Only the time interval of the respective deviations and deformations, as well as demands concerning the quickness of their compensation, must be taken into consideration. A suitable name for such kind of means is a "servo-static" one which differs from the known hydrostatic guideway.

The servo mechanism may comprise one or more pairs of servo indicators and servo motors. Preferably, multiple units are to be used. The servo indicator may be an electro servo mechanism or it may be hydraulic, either being suitable so long as a linear signal is obtained.

Full details of the present invention will be seen from the following description which also illustrates its numerous advantages and objects.

BRIEF DESCRIPTION OF THE DRAWINGS

In the accompanying description, reference is made to the attached drawings in which.

Figure 1:
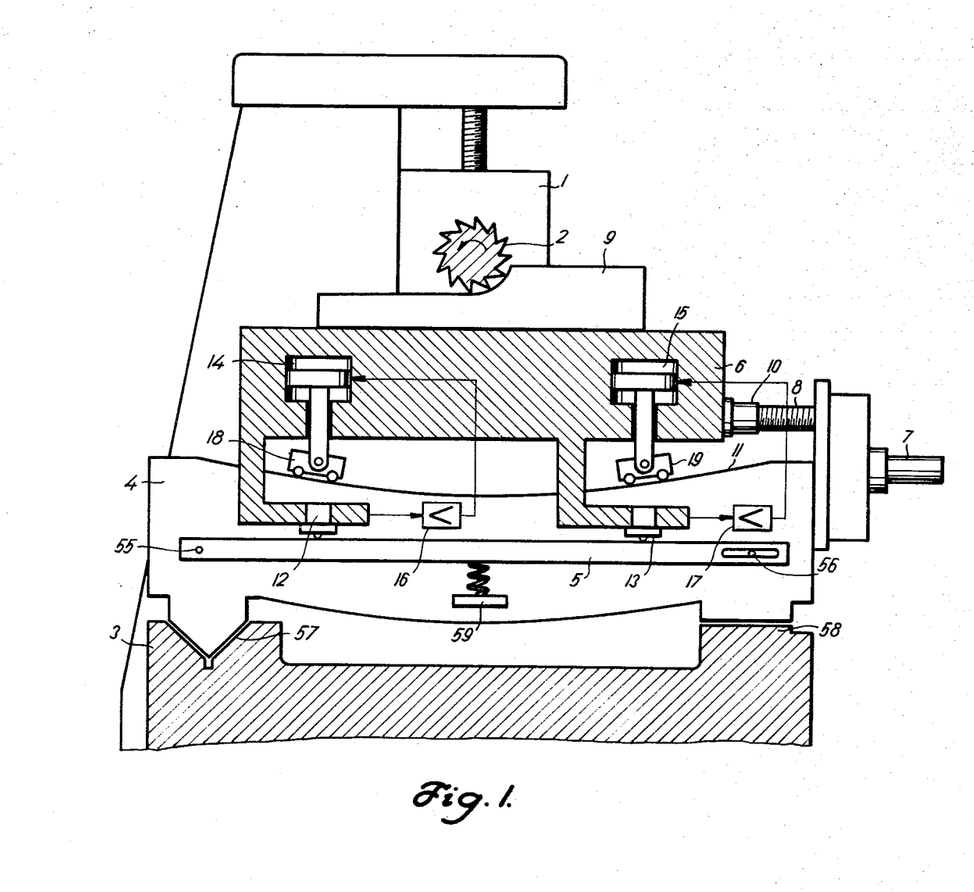
FIG. 1 is a schematic sectional view of a milling machine employing the present invention.

Turning now to FIG. 1, the present invention is depicted as applied to a milling machine comprising a headstock 1, a cutter 2 and a frame 3 on which is mounted a sled 4. The sled 4 rests within and is movable along guides 57 and 58. A templet or control cam 5, having a control surface extending transversely to the direction of movement, is pivotally fixed to the sled 4 by a pivot pin 55 at one end and a sliding pivot connection 56 at the other end. The templet is also provided with a longitudinal hole, and is centrally supported by a spring 59.

A work table 6 having a feed drive 7, a lead screw 8 and a feed nut 10 is placed on the upper surface of the sled 4. The sled 4 is formed with an arcuate grooved guideway 11 transverse of its direction of movement to permit the table 6 to reciprocate from left to right as seen in FIG. 1.

The table 6 is provided with a servo-static assembly which maintains it in balance horizontal condition during working conditions comprising one or more servo-deviation pick-ups 12 and 13. (Two are shown in this embodiment, although as will be seen, it is preferable that more be employed.) The servo-deviation pick-ups in the present embodiment are electrical devices adapted to translate mechanical variable motion between two relatively positioned parts into a continuous signal and includes circuitry to provide a null or absence of a signal when the parts are in a relative predetermined position and a signal indicative of the direction and degree of deviation from the null or predetermined position.

The servo-deviation pick-ups 12 and 13 are each connected to and control a servo motor 14 and 15 via amplifiers 16 and 17 respectively. The servo motors 14 and 15 each comprise a double acting hydraulic chamber or cylinder and short stroke piston of conventional design. The pistons of each of the servo motors 14 and 15 are connected to a roller carriage 18 and 19 respectively which ride on the surface of the guideway 11. The servo motors are each provided with suitable sources of fluid under pressure (not shown) which is activated by the signal derived from the servo-deviation pick-ups 12 and 13 to raise or lower the table 6 by individually extending or retracting the pistons.

Operatively, the device shown in FIG. 1 functions so that the table 6 moves over the sled from left to right, or vice versa, being driven by drive 7. Simultaneously, the sled 4 moves back and forth, so that the workpiece 9 is engaged in predetermined configuration by the cutter 2. The servo-static assembly comprising the combined servo indicators and servo motors maintains the table 6 aligned against any deflection of the sled 4 (e.g., guideway 11) in the vertical direction which may be caused by the weight of the table 6, the workpiece 9 or the forces created by the cutting operation itself. This is accomplished since as soon as the table 6 tends to be deflected under the above conditions, the servo indicators produce a signal which indicates the direction and degree of deviation. This signal is then employed to operate the individual hydraulic servo motor which raises or lowers the table 6 to the necessary degree to compensate for the deflection. As this is done, the servo indicator returns toward its null position which when reached ceases to operate the servo motors. As the table moves to its compensatory position, the templet 5 pivots to its horizontal position, thus maintaining a straight linear control path.

The deflection of the templet 5 caused by its own weight is compensated for by the spring 59 which acts on the opposed pivot connections 55 and 56. These pivot points are preferably located above the sled guides 57 and 58 and, consequently, the templet 5 is not effected by deflections in or deformations of the sled body 4. As a result, the templet 5 normally maintains a fixed straight horizontal position with respect to the sled 4.

In the device shown in FIG. 1, it will be assumed that the frame 3 is rigid and that the sled guides 57 and 58 are of conventional design. The servo mechanism and carriage construction are also of conventional design and may be modified or changed as desired.

It will be observed that the constant effect of the servo mechanism (i.e., elements 12–19) results in the guiding of the templet along a straight path. Actual deviation of the servo indicators is very small and generally independent of deflection of the guideway 11. The correct function of the servo-static guide mechanism is also independent of the horizontal movement of the table 6 caused by the drive means or the back and forth movement of the sled.

To insure correct positioning and uniform support of the table 6, it may be necessary, and often is preferable, to employ more than two servo indicators and their associated servo motors. Additionally, a second or even third templet may be employed to provide deviation signals from another side of the table. The additional servo motors should be arranged and fed in parallel from a common templet. Further, the servo indicators and servo motors may be arranged in pairs or sets about the machine tool to enable adjustment in more than one plane. In this manner, compensation for movement in any direction can be made. In the device of FIG. 1, it is also assumed that deflection of the sled 4 or frame 3 in the direction parallel to the axis of the milling cutter are insignificant and that the movement of the table 6 over the sled 4 is carried out in conventional mechanical manner.

Figure 2:
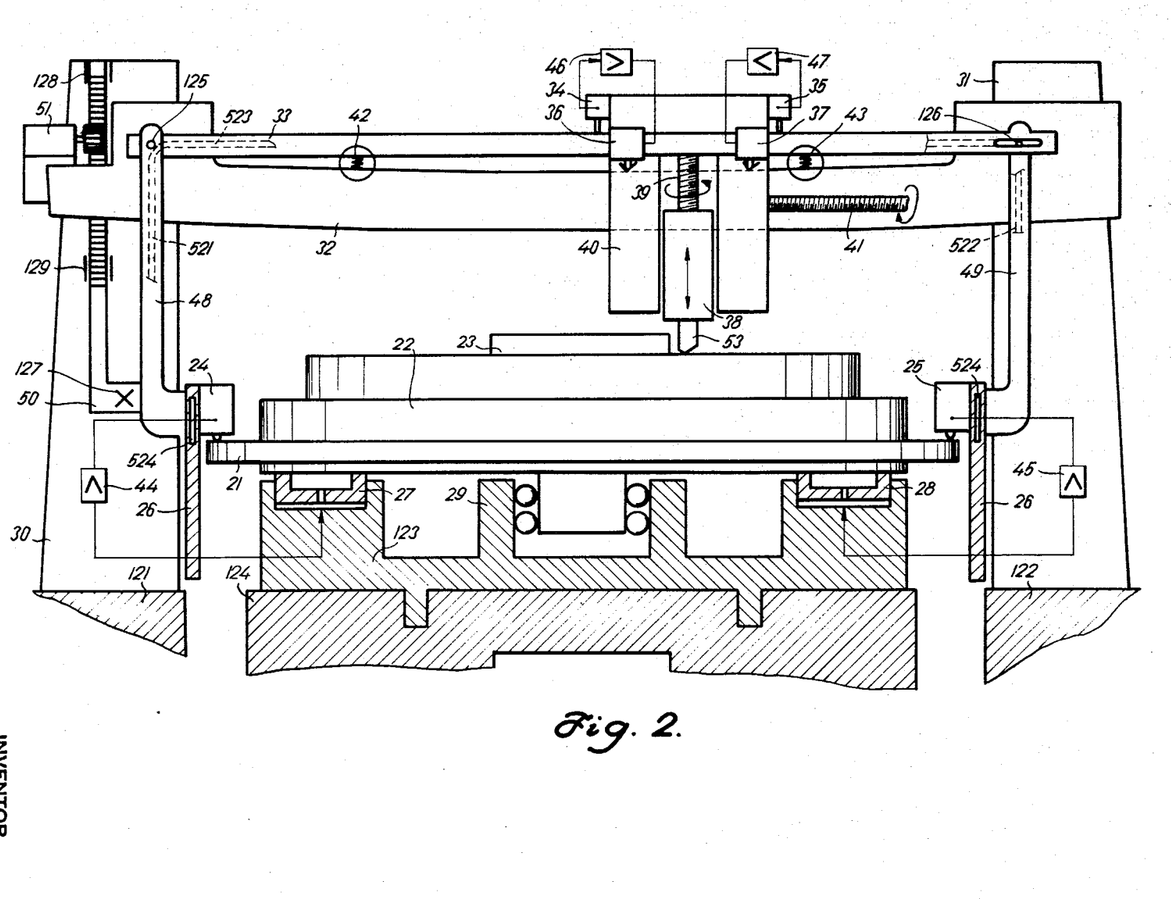
FIG. 2 is a schematic view of a vertical lathe employing the present invention.

In FIG. 2, there is shown another design and application of the present invention. The device of FIG. 2 comprises a vertical lathe or miller having a circular turntable 22 about which a peripheral control templet surface 21 is formed. A second templet 33 is carried above the table and is supported by means of springs 42 and 43. A workpiece 23 is clamped to the table 22. Spaced about the turntable 22 are a number of servo-deviation pick-ups 24 and 25, each having a follower engaging the surface of the templet 21 so as to be responsive to the rotary motion of the table. The servo-deviation pick-ups are secured fixedly to a stationary circular support frame 26. The turntable 22 is retained in the seat 29 of a frame 123 which rests upon a base 124, and is supported by a number of servomotors 27 and 28 corresponding to the number of pick-ups by which each is controlled via an amplifier 44 and 45. It will be seen that the servo motors are opposed to each other, acting in combination against each other.

A pair of spaced columns 30 and 31 standing on pedestals 121 and 122 support a cross rail 32 which may or may not be vertically movable. The second templet 33 is mounted above the cross rail 32 with the springs 42 and 43 interposed therebetween. The templet 33 is pivotally supported at its ends by a pivot pin 125 and a pivot and sliding connection 126 similar to the one shown in FIG. 1. A second group of servo pick-ups 34 and 35 and their associated amplifiers 46 and 47 controlling servo motors 36 and 37 are mounted on a rail 40 to be activated by the templet 33. The rail head 40 is secured to the cross rail 32 and is horizontally movable by a lead screw 41 secured to a drive (not shown). A tool holder 38 mounting a tool 53 depends from the head 40 and is also driven by a lead screw 39 from a not shown drive.

The templet 33 is provided with fixed holders 48 and 49 (if the cross rail 32 is not vertically movable) which are mounted on to the respective columns 30 and 31. A bracket 50 carrying a rack is fixed to the column 30 at a spot 127 but is slidingly positioned at spots 128 and 129. A measuring device 51 having a pinion meshing with the rack is secured to the cross rail 32. The supporting frame 26 is provided with a bore 524 for passage of a fluid medium of predetermined and regulated temperature from a source not shown. Holders 48 and 49 as well as templet 33 are also provided with similarly functioning bores 521, 522 and 523.

The servo-static assembly employed in the device of FIG. 2 serves both to compensate for the deviation of the turntable 22, in the vertical direction, and for the deviation of the rail head 40 resulting from the deflection of the rail 32. While two opposed servo indicators and servo motors are shown for each function, it is preferred that three or more be actually used. The functioning of the servo mechanisms is analogous to the functioning of the similar elements described in connection with FIG. 1, the only difference being that in the device of FIG. 1, the servo motors operate on rolling carriages while in the device of FIG. 2, the servo motors operate directly on the table 22. Full details of a suitable design will be seen in FIGS. 3, 4 and 5, which also show the details of a hydraulic or fluid operated servo-static assembly.

Since the control frame 26 is fixed to columns 30 and 31, the servo-static assembly maintains the table at a constant axial position with respect to the columns independently of deformations or deflection of turntable frame 123 and its base 124 or the fit of the turntable in the seat 29. Deformation of the pedestals 121 and 122 have little influence on the relative position of the table 22 and the columns 30 and 31 in the vertical direction. Since the motion of rail head 40 is derived from the control surface of the second templet 33 and is connected to the cross rail 32 at spots 125 and 126, it is not influenced by any cross rail deflection. On the other hand, it may be fixed in brackets 48 and 49 which are used only in case the rail 32 is not adapted to move vertically, and is again not influenced by its deflection.

The brackets 48 and 49 secure a constant vertical distance between the templet 33 and servo indicators 24 and 25 independently of the temperature and other deformations arising in columns 30 and 31. The passage of a liquid with a regulated temperature through the hollow cores 521, 522, 523 and 524 of the control components, i.e., of the support frame 26, of the fixed templet holders 48 and 49, and of the templet 33, maintains the elements at a constant dimension and shape independently of the temperature influence and forces which effect different machine parts.

In the event the cross rail 32 is made to be vertically movable, the fixed templet brackets 48 and 49 may not be used. The vertical position of the cross rail may, however, be measured by means of the rack 50 meshing with the pinion of the device 51. The measuring rack holder, which, as noted previously, is in this case a component for measuring of the vertical position of the respective cross rail end, may be connected to the column 30 in the spot 127 (i.e., near the fixed spot of the control frame with the indicator 24) while in spots 128 and 129, it must be allowed free axial movement as to the column 30. Thus, if a liquid of regulated temperature passes through the hollow of the measuring rack holder 50, a measurement of the resnective cross rail end position is obtained which is independent upon temperature influence.

The compensatory action of the servo mechanism of FIG. 2 is exactly the same as described in connection with FIG. 1. That is, as the machine parts deform and the templet moves, a signal is generated which operates the servo motors to make the necessary adjustment. As soon as the adjustment is made, the feed back through the repositioned templet produces a null, ceasing further movement.

Figure 3:
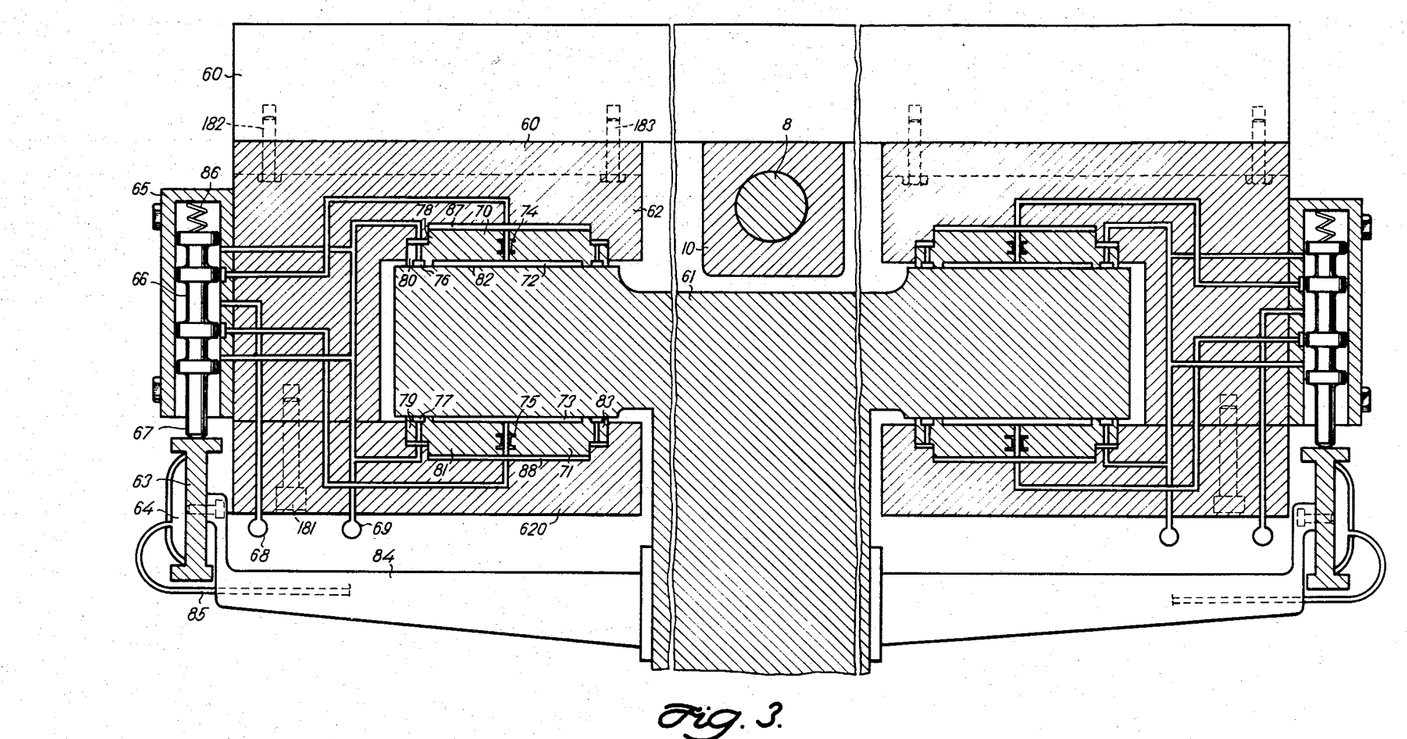
FIG. 3 is a sectional view of of a milling machine showing a second servo-static assembly according to the present invention.
Figure 3A:
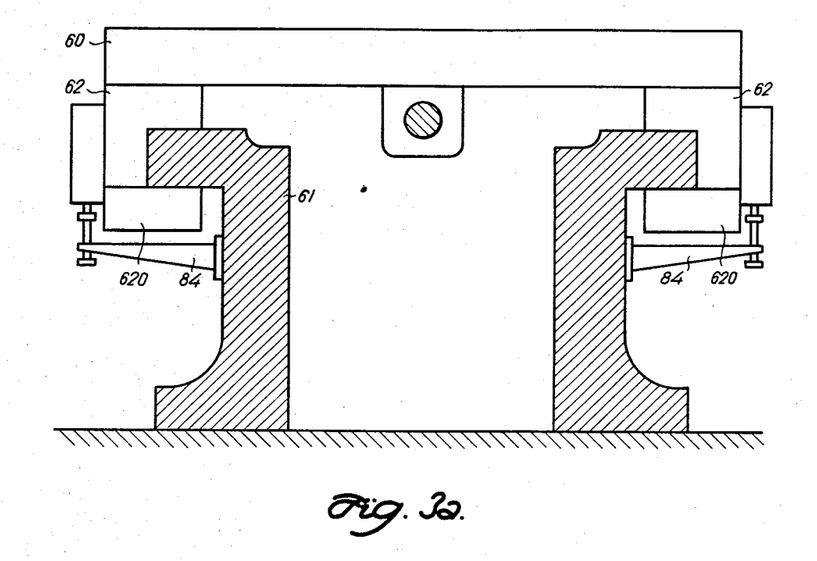
FIG. 3a is an overall view of the machine of FIG. 3.
Figure 4:
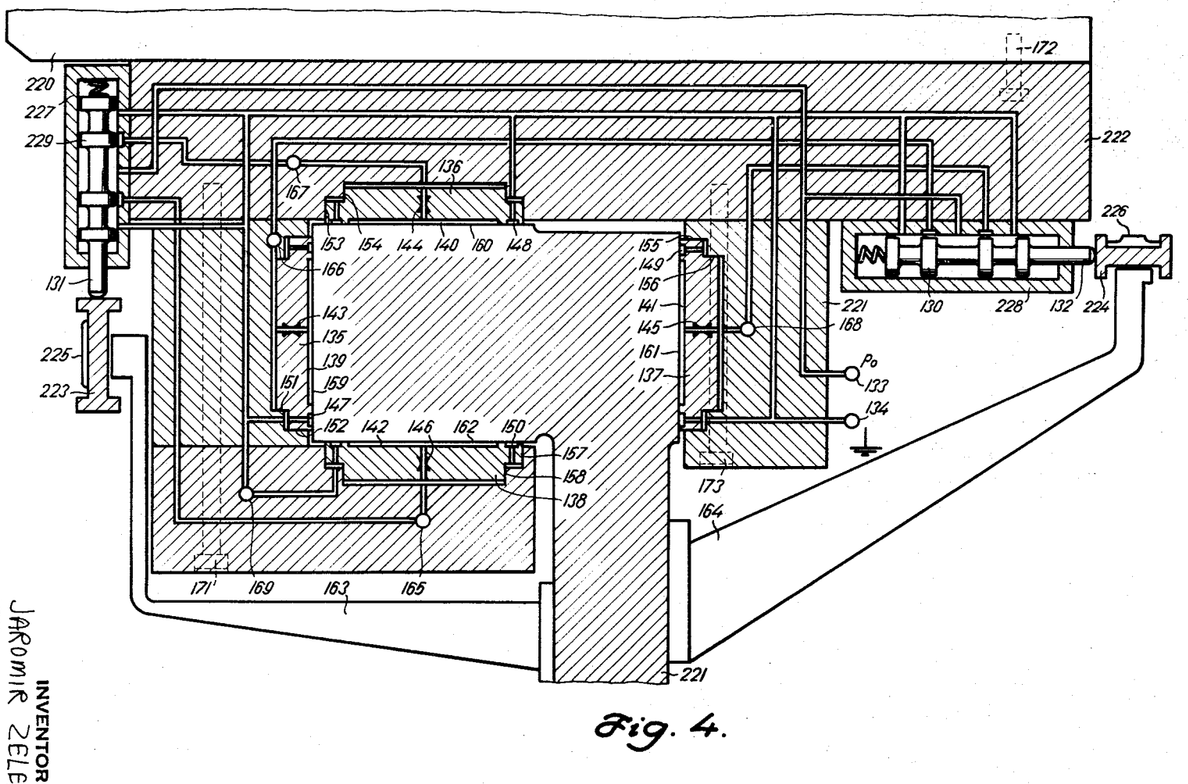
FIGS. 4 and 5 are views similar to FIG. 3 showing two modifications of the assembly.
Figure 5:
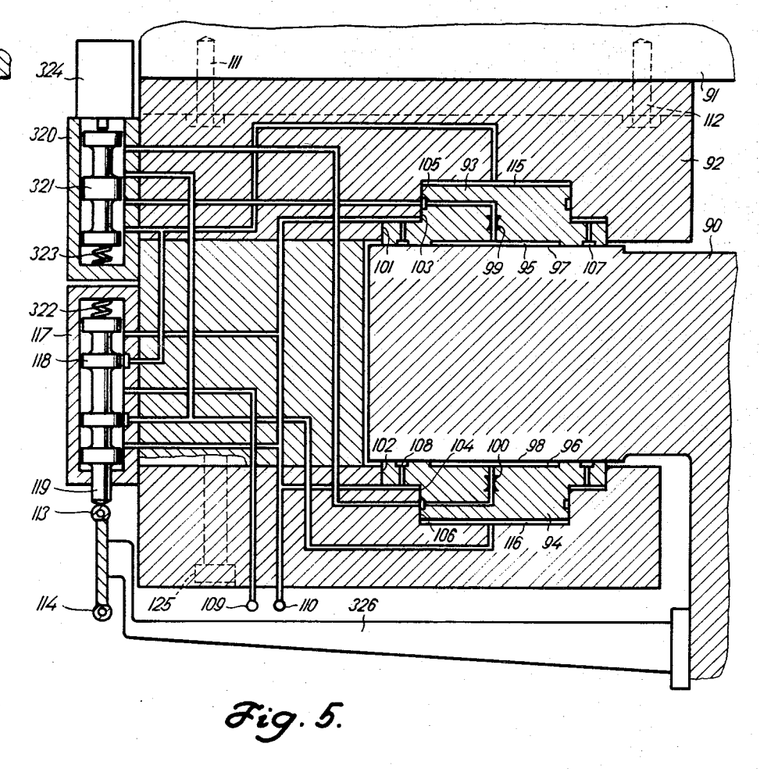

While in FIGS. 1 and 2, electro servo deviation indicators have been shown, it was mentioned that hydraulic devices accomplishing the same result could be employed. Such hydraulic units are shown in FIGS. 3-5, it being understood that each may be employed in place of the other and in place of the electro or electrohydraulic servo mechanisms of FIGS. 1 and 2. While it will be seen that in FIGS. 3-5 the servo motors are placed in opposition to each other to provide double action, they may be used independently and separately.

In FIG. 3, the hydraulic vertical guide servo motor assembly is located in a machine tool between an upper part 60 which is vertically movable and lower part 61 which is relatively fixed. These parts are analogous to the table 22 and base 123, respectively, shown in FIG. 2. Between the two machine parts and, in particular, about the lower part 61 are mounted a pair of servo-static guide and manifold blocks 62 and 620 which are connected together by means of screws 181. The blocks are connected to the upper machine part 60 by screws 182. Guideways or cutouts 82 and 83 are formed on opposite sides of the lower machine part 61 and the opposing faces of the guide blocks 62 and 620 are recessed and spaced therefrom to provide a chamber 87 and 88.

Mounted on the exterior of the guide block 62 is a hydraulic slide valve body 65 in which is located a slide valve 66 having a follower pin 67 extending outwardly of the body. A spring 86 is mounted within the body against the valve 66 and normally biases the pin 67 outwardly against the face of a control templet 63. The control templet or cam 63 is provided with a passage 64 for flow of a liquid medium of predetermined or regulated temperature and is mounted on a bracket 84 secured to the machine part 61. The bracket is provided with a conduit 85 leading to the passage 64 about the templet.

Located between the block 620 and the bracket 84 is a storage tank for a pressurized fluid such as oil. Interconnecting the tank, the slide valve body 65 and the chambers 87 and 88 are a plurality of conduits terminating in an inlet 68 and an outlet 69. Located in each of the chambers 87 and 88, which comprise the cylinder space of a hydraulic motor, is a piston element 70 and 71 respectively. The pistons 70 and 71 are provided with elevating recesses 72 and 73, axial intake throttling valve nozzles 74 and 75, and outlet grooves 76 and 77 respectively. Each is also provided with packing O-rings 78, 79, 80 and 81 sealing the same with respect to the machine parts 62 and 620.

The servo motor assembly of FIG. 3 operates to position the upper machine part 60 vertically with respect to the lower part 61. Pressurized fluid, such as oil, is supplied to both guide blocks 62 and 620 through inlet 68, passing into the middle collars of the slide valve piston 66 from which it passes to the upper chamber 87 and to the lower chamber 88, depending solely upon the actual position of the follower 67. The follower 67 acts as a sensor of linear or rectangular deviation as a result of its engagement with the control templet 63. In this instance, the hydraulic nature of the cylinder 65 and piston 66 is in exact correspondence with the electrical servo mechanism shown in FIG. 1. As a consequence, the pressure in chambers 87 and 88 against the respective elevating recess faces 72 and 73 can be made to vary from O to $P_o$ which is, of course, the pressure of the fluid at the inlet 68.

When the relationship of the machine parts 60 and 61 is in relative equilibrium or in their predetermined neutral position, the pressure in each of the chambers is equal, each being then $P_o/2$. When the slide valve 66 is forced into an upward position, on deformation of the table, for example, flow of fluid to the chamber 87 increases and that chamber pressurizes from $P_o/2$ to $P_o$, depending upon the degree of deviation of the table. Simultaneously, the fluid to the other chamber 88 is reduced, resulting in a decrease of pressure therein corresponding to the increase of pressure in chamber 87. In this manner, the machine parts are repositioned in compensation of the deformation. Should the deformation occur in the opposite direction, the pressurization and depressurization of the chambers 87 and 88 are reversed, due to the slide valve movement which would then reverse the flow of fluid.

The chamber 87 is hydraulically connected to the recess 72 of the piston 70 through the infeed throttle nozzle 24. The recess 72 is dimensioned relative to the diameter of the chamber 87 so that only a very light difference in pressure causes the piston to move. In this manner, only small losses of fluid (oil) escape between the piston and guide cutout 82. The loss of fluid is practically insignificant. That is why the liquid passage through the infeed throttle nozzle 74 and pressure differential in the working space 87 and in the recess 72 may be maintained minimal as well. The infeed throttle nozzle 74 is not absolutely needed, but it is preferred since it secures a quick operation of the piston 70 at the instant of hydraulic initiation and at the instant of pressure increase in the oil inlet 68, thus limiting fluid loss.

The piston 70 may be provided along its circumference with a discharge fluid groove 76 which is connected to the outlet 69. This groove further insures diminished fluid loss. The fluid pressure on the contact surface of the piston 70 with the guideway cutout 82, outside the groove 76, is practically none, which means that even the quantity of fluid discharge onto the guideway 82 during the operation is practically none. The optimal diameter and shape of the piston 70 may be varied to suit different requirements although it has been found that the round piston shape which is shown in FIG. 3 having two packing rings 78 and 80 is preferable because of its easy production. From a functional point of view, it is possible, of course, to use a piston with a sliding surface of a different shape, e.g., of a square one or of any other shape.

The construction described with respect to piston 70, throttle nozzle 74, working space 87, lightening recess 72, waste oil groove 76, guideway 82 and packing rings 78 and 80, is to be applied analogically to the piston 71, throttle nozzle 75, working space 88, lightening recess 73, oil waste 77, guideway 83 and packing rings 79 and 81.

The servo-static guide block is shown in two parts 62, and 620 which are connected together by means of screws 181. On the other hand, the whole block may be screwed on the machine part 60 by means of the connection screws 182 and 183. If it is not possible for one of the relatively guided machine parts 60 and 61 to be lifted because of its great weight, the servo-static guide block may be designed simply with one piston acting against the guided machine part instead of the two opposed hydraulic motors 70 and 71. This situation is the one described in FIG. 2. The lower part of the block 69 which includes the piston 71 and its accessories may also be omitted in case the machine part 60 is a moving one of great weight. Alternatively, the upper piston 70 with accessories may be removed in case the lower machine part 61 is a moving one. It is further possible to design the follower slide valve 66 simpler and with two control edges only rather than the four shown. In fact, it is possible to use any other design of hydraulic or pneumatic slide valves and a corresponding distribution system retaining the servo mechanic principle to control the pistons 70 and 71 by a linear mechanical follower 67.

In some applications where a minimal friction on the guideways would be required and some pressure medium loss could be tolerated, it is possible to design the surface of the recess so that in the balanced or neutral position, a greater amount of the pressurized fluid medium may flow through the throttle nozzle 74 and 75, and some constant distance between the piston bearing surface and guideways 82 and 83 may be maintained. In this case, frictioned forces are in fact eliminated, as there will be no mechanical contact between the piston 70 and 71 and guideways 82 and 83. There is a difference here, compared to the usual device as the pistons 70 and 71 follow all shape deviations of guideways 82 and 83 at a constant distance. Fluid medium loss is constant all over the length and it is independent upon guideways defects. Distances between the piston bearing surface and guideways 82 and 83 may be minimized because there is no danger of mechanical contact and seizing should the deviation not exceed the working lift of pistons 70 and 71.

FIG. 4 shows an example of a servo-static guide block with two pairs of independent position servo mechanism controlling the position of relatively guided machine parts 220 and 221 in opposed directions perpendicular to the other. One of the paired servo mechanisms includes the body 227 mounted on block 222, slide valve 229, follower 131 and templet 223 having a surrounding bore 225. A bracket 163 holds the templet 223. The associated opposed servo motors include hydrostatic pistons 136 and 138, infeed throttle nozzles 144 and 146, recess 140 and 142, discharge grooves 148 and 150 and packing rings 153, 154, 157 and 158. The function of this hydraulic servo mechanism is completely analogous to the described function of the mechanism shown in FIG. 3.

The second pair of servo mechanisms also includes a valve body 228 mounted on block 222, a slide valve 130, a follower 132, a templet 224 having a bore 226 and a support bracket 164. The servo motor includes pistons 135 and 137, infeed throttle nozzles 143 and 145, recess 149 and 141, discharge grooves 147 and 149, and packing rings 151, 152, 155 and 156. This latter servo mechanism works in a direction perpendicular to the working direction of the first servo system.

The combined paired servo mechanisms, however, work in the direction being rectangular to the relative working motion of the two machine parts 220 and 221, i.e., rectangular to the direction of the mutual guiding of the mentioned machine parts.

In some cases, it may be desirable to connect the several servo motors in parallel so that they can be controlled by means of only one slide valve. The design of the servo-static guide block, shown in FIG. 4, permits such connection by means of the holes 165, 166, 167, 168 and 169 that are formed in the blocks. Outlets from the holes are provided with packing rings so that it is possible to connect on one side or on both sides additional manifold guide blocks which need not be provided with an associated slide valve. Excess outlets for slide valves could be blocked. The servo-static guide and manifold 222 may be produced, because of an easy assembly, from two or more parts which are connected by means of connecting screws 171 and 173. The whole block may be screwed to the machine part 220 by means of connecting screws 172.

In FIG. 5, still another version of the servo mechanism employing a hydraulic system is shown. The device shown in this figure is completely analogous to the one shown in FIG. 3 with modification, however, to the structure of the slide valve and the feed of the pressurized fluid to the servo motor chambers.

FIG. 5 shows two mutually guided machine parts 90 and 91 between and about which a block and manifold 92 is mounted. In the block 92, there is found an inlet 109 for pressurized fluid, an outlet 110, and two servo motors having respective chambers 115 and 116, hydraulic pistons 93 and 94, recesses 95 and 96 and infeed nozzles 99 and 100. Packing rings 101, 102, 103, 104, 105 and 106, outlet grooves 107 and 108 are also provided. The machine part 90 is provided with guideway cutouts 97 and 98 and supports a bracket 326 connected to the end of which is formed a circular control templet 113 with a space 114, for a liquid of regulated temperature to pass through. The surface edge of the control templet 113 is engaged and followed by a follower 119 of a slide valve 118. The slide valve 118 is urged into contact with the control templet 113 by means of a spring 322.

The slide valve 118 is located in a body 117 mounted on the block 92. A second body 320 holding a locking slide valve 321 is also mounted to the block 92. The locking slide valve 321 is pushed by means of a spring 323 against an electrocontrol magnet 324 having a pressure function when activated. The parts of the block 92 are connected together by means of connection screws 125, and the block 92 is connected to the machine part 91 by means of connection screws 111 and 112.

The infeed nozzles 99 and 100 enter the pistons, of their respective servo motors, radially rather than axially as in the prior embodiment, and are fed from the locking slide valve body 320. In addition, a secondary feed conduit system extending axially into the chambers 115 and 116 at their outer ends is provided to deliver fluid under pressure from the control valve body 118. The arrangement can be used to effectively lock the pistons 93 and 94 against the machine part 90 to avoid relative movement of the piston with the part during operation of the motion compensating function of connecting screws 172.

The locking slide valve 321 slides in the valve body 320 and it is controlled by means of the spring 323 and by means of the electro magnet 324. If the magnet 324 is not under current, the locking slide valve 321 is forced by spring 324 into its upper position as it is seen in FIG. 5. The hydraulic connection of the whole system is in this condition functionally as described in connection with FIG. 3. If it is desired to lock the parts 90 and 91 against relative movement, current is supplied to the magnet 324 which then pushes down against locking slide valve 321 moving it into lower position. In this position, the locking valve 321 disconnects the connection between chambers 115 and 116 and the inlet 109 since it blocks the flow of fluid to the respective infeed throttle nozzles. The pressure in both chambers drops to zero and its elevating function disappears. However, the pressure entering the chambers 115 and 116 from the secondary conduit forces the pistons 93 and 94 downwardly against the guideways 97 and 98 to engage the machine parts locking the parts 90 and 91 against relative movement. The position servo mechanism function in the direction is rectangular to the direction of the working motion as is maintained so that the relative position of the machine parts 90 and 91 in this rectangular direction is controlled by means of the slide valve 118 with its follower 119 engaging with the templet 113. Unlocking is accomplished when magnet 324 is switched off, so that it stops pushing down the locking slide valve 321 and the spring 323 returns the locking slide valve 321 into the original position, the elevating recesses 95 and 96 function again and the friction between the pistons 93 and 94 and the guideways 97 and 98 drops to the previous minimal valve.

Figure 6:
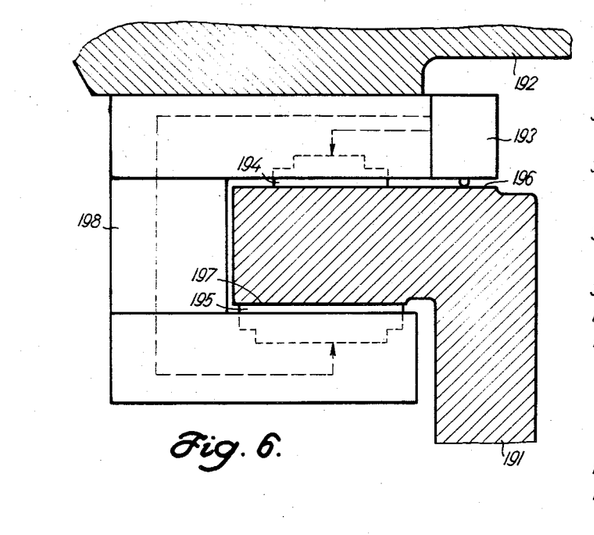
FIG. 6 is a schematic view of still a third modification of FIG. 3.

In FIG. 6, there is shown a schematic design of a servo-static guideway block having a rectangular deviation servo indicator 193 mounted directly thereon and following the guide surface 196 of the actual machine part which here functions as the control templet. The function of this design is in all other respects the same as the function of that one being figured in FIG. 3.

The guide device according to the invention may be used for machine tools of great mass, weight or size requiring control in small degrees with great accuracy. Further, it may be used in machines where temperature influences or base deformation would effect the machine accuracy.

What we claim is:

1. A control system for machine tools having first and second machine members mutually movable relative to each other in a guided path, said system comprising a templet connected to the first of said machine members, said templet and said other of said machine members being relatively movable with respect to each other, a servo pick up attached to the second of said machine members having means engaging the templet to sense the deviation of said machine members in a direction perpendicular to said guided path and means for producing a signal indicative of the direction and degree of said deviation and a servo motor positioned in contact with one of said machine members, said servomotor having means responsive to said signal to perpendicularly reposition said one machine member until full compensation for said deviation between said machine members is effected.

2. The system according to claim 1 wherein said templet comprises an elongated element, pivotally secured at one end to the first machine member and slidably secured at the other end to said first machine member.

3. The system according to claim 2 wherein said templet is horizontally positioned and supported in part by resilient means.

4. The system according to claim 1 wherein said templet is provided with duct means adapted to provide a source of fluid under predetermined pressure.

5. The system according to claim 1, including a support for said templet, said support being mounted independently of the movable machine tool members and of its deviation to provide a self supporting measuring reference.

6. The system according to claim 5 wherein the templet support is provided with duct means adapted to deliver a fluid under predetermined pressure.

7. The system according to claim 1 including a guide way for relatively positioning said first and second machine members in which the templet is a portion of said guide way.

8. The system according to claim 1 wherein the servo pick-up is an electro device producing a continuous signal.

9. The system according to claim 1 including amplifier means for passing the signal to said servomotor.

10. The system according to claim 1 wherein the servo pick up is a hydraulic copying valve with a copying tracer acting in contact with the templet.

11. The system according to claim 1 including a guideway by which one member is supported by the other and wherein the servomotor is a hydraulic cylinder with a hydraulic piston acting in contact with the surface of the guideway.

12. The system according to claim 11 wherein the piston has a head end, the surface of which is provided with a concave recess and includes means for hydraulically interconnecting the working space of the hydraulic cylinder with said recess.

13. The system according to claim 12 wherein the means for hydraulic interconnecting the recess and the hydraulic cylinder includes an adjustable nozzle.

14. The system according to claim 13 including a slide valve interposed in the means for hydraulically interconnecting said recess and said hydraulic cylinder for interrupting this connection.

15. The system according to claim 12 wherein the recess within the hydraulic piston is provided about its periphery with a groove connected to a source of hydraulic fluid.

16. The system according to claim 11 wherein the hydraulic piston has an enlarged cross section on its end adjacent to the surface of said guide way.

17. The system according to claim 1 wherein said one machine member is rotatable, and said templet is circular and being located about the periphery of said one machine member.

18. The system according to claim 1 including a plurality of servo-motors for positioning the first and second machine members and a plurality of servo pickups associated therewith, said servo-motors being responsive to a selected combination of servo pickup signals.

19. The system according to claim 18 wherein the servo pick ups and servomotors are arranged in selected paired sets, the servo-motors being placed in opposition to each other about the associated machine member to effect an opposed double action against said associated machine member.

* * * * *